US012015158B2

(12) United States Patent
Hasché et al.

(10) Patent No.: US 12,015,158 B2
(45) Date of Patent: Jun. 18, 2024

(54) METHOD FOR PRODUCING A CATALYST-COATED MEMBRANE

(71) Applicant: Heraeus Deutschland Gmbh & Co. KG, Hanau (DE)

(72) Inventors: Frédéric Hasché, Hanau (DE); Markus Nesselberger, Hanau (DE); Nadia Kuwertz, Hanau (DE); Florian Eweiner, Hanau (DE); Leonard Stoica, Hanau (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 30 days.

(21) Appl. No.: 17/624,725

(22) PCT Filed: Apr. 29, 2020

(86) PCT No.: PCT/EP2020/061867
§ 371 (c)(1),
(2) Date: Jan. 4, 2022

(87) PCT Pub. No.: WO2021/001082
PCT Pub. Date: Jan. 7, 2021

(65) Prior Publication Data
US 2022/0255086 A1 Aug. 11, 2022

(30) Foreign Application Priority Data
Jul. 4, 2019 (EP) ..................................... 19184400

(51) Int. Cl.
*H01M 4/88* (2006.01)
*H01M 8/1004* (2016.01)
*H01M 8/1039* (2016.01)
*H01M 8/10* (2016.01)

(52) U.S. Cl.
CPC ......... *H01M 4/881* (2013.01); *H01M 4/8828* (2013.01); *H01M 4/8882* (2013.01); *H01M 8/1004* (2013.01); *H01M 8/1039* (2013.01); *H01M 2008/1095* (2013.01)

(58) Field of Classification Search
CPC ........ C08K 3/011; C08K 3/08; C09D 127/18; C25B 1/04; C25B 9/23; H01M 2008/1095; H01M 4/881; H01M 4/8828; H01M 4/8832; H01M 4/8835; H01M 4/8839; H01M 4/8882; H01M 8/1004; H01M 8/102; H01M 8/1039; Y02E 60/36; Y02E 60/50
See application file for complete search history.

(56) References Cited

U.S. PATENT DOCUMENTS

| 5,399,184 | A | 3/1995 | Harada |
| 5,882,810 | A | 3/1999 | Mussell |
| 9,722,255 | B2 | 8/2017 | Sharman |
| 9,735,441 | B2 | 8/2017 | Kandoi et al. |
| 9,799,894 | B2 | 10/2017 | Yamaguchi et al. |
| 10,283,779 | B2 | 5/2019 | Neumann et al. |
| 2011/0097651 | A1* | 4/2011 | Yim .................... H01M 8/1004 429/535 |
| 2017/0271693 | A1 | 9/2017 | Choo |

FOREIGN PATENT DOCUMENTS

| EP | 2 774 203 | 9/2014 |
| EP | 2954951 | 12/2015 |
| JP | H06-020709 | 1/1994 |
| JP | 2005-085544 | 3/2005 |
| JP | 2013-514618 | 4/2013 |
| JP | 2015-092464 | 5/2015 |
| JP | 2017-117751 | 6/2017 |
| WO | 92/15121 | 9/1992 |
| WO | 2007/028626 | 3/2007 |
| WO | 2013/064640 | 5/2013 |

OTHER PUBLICATIONS

Solvay Technical Data Sheet, Dec. 21, 2015 (Year: 2015).*
Chemours Product Bulletin, pp. 1-2, 2019 (Year: 2019).*
Written Opinion and International Search Report dated Jul. 13, 2020 in PCT/EP2020/061867.
Sri Harsha Akella, et al., "Studies on Structure Property Relations of Efficient Decal Substrates for Industrial Grade Membrane Electrode Assembly Development in PERMFC", Apr. 14, 2018.
Bernard Bladergroen, et al., "Overview of Membrane Electrode Assembly Preparation Methods for Solid Polymer Electrolyte Electrolyzer", Chapter 3, 2012.
Ahmet Kusoglu, et al., "New Insights into Perfluorinated Sulfonic-Acid Ionomers", Chemical Reviews, 2017.

* cited by examiner

*Primary Examiner* — Victoria H Lynch
(74) *Attorney, Agent, or Firm* — Dicke, Billig & Czaja, PLLC

(57) ABSTRACT

The present invention relates to a method for producing a membrane for a fuel cell or electrolytic cell, in which (i) a liquid coating composition, which contains a supported catalyst containing precious metal and also contains an ionomer, is applied to a polymer electrolyte membrane which contains an ionomer, the ionomer of the liquid coating composition and the ionomer of the polymer electrolyte membrane each being a copolymer which contains as monomer a fluoroethylene and a fluorovinyl ether containing a sulfonic acid group, (ii) the coated polymer electrolyte membrane is heated to a temperature in the range from 178° C. to 250° C.

11 Claims, 3 Drawing Sheets

METHOD FOR PRODUCING A CATALYST-COATED MEMBRANE

CROSS-REFERENCE TO RELATED APPLICATIONS

Figure 1:
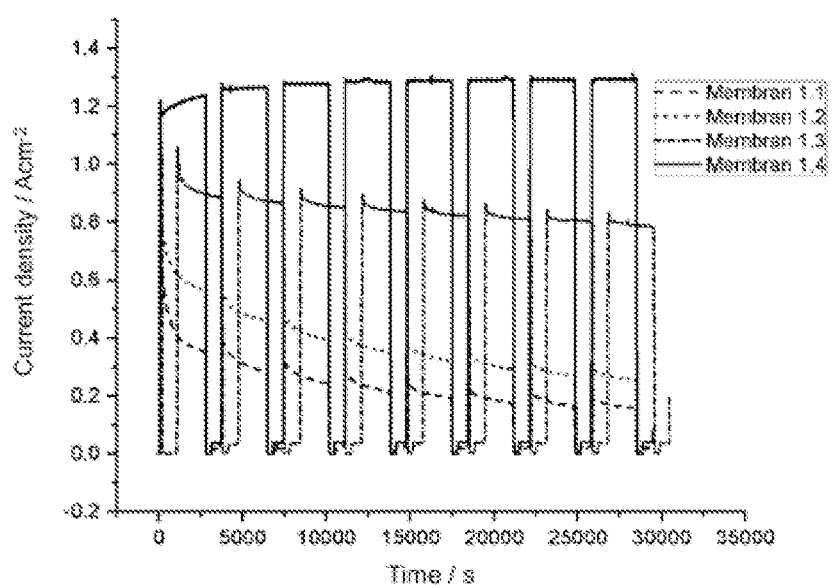

This Utility Patent Application claims priority under 35 U.S.C. § 371 to International Application Serial No. PCT/EP2020/061867, filed Apr. 29, 2020, which claims the benefit of European Patent Application No. 19184400.0, filed Jul. 4, 2019; which are both incorporated herein by reference in their entirety.

The present invention relates to a method for producing a catalyst-coated membrane for a fuel cell or electrolytic cell.

The membrane-electrode assembly of a PEM fuel cell or electrolytic cell contains a polymer electrolyte membrane ("PEM") on the front and rear sides (i.e., their anodic and cathodic side) to each of which a catalyst-containing layer and an electrically conductive, porous gas diffusion layer (e.g., in the form of a carbon paper or carbon fiber fabric) are applied.

The catalyst-containing layer can, for example, first be applied to the gas diffusion layer, and this catalyst-coated gas diffusion layer is subsequently pressed together with the polymer electrolyte membrane to obtain a membrane electrode assembly. Alternatively, the catalyst-containing layer can first be applied to the membrane and the coated membrane is then connected to the gas diffusion layers. See, for example, B. Bladergroen et al., "Overview of Membrane Electrode Assembly Preparation Methods for Solid Polymer Electrolyte Electrolyzer", 2012, DOI: 10.5772/52947.

It is also known that a catalyst-coated membrane can be produced by (i) applying a catalyst-containing composition directly to the membrane or, alternatively, (ii) the so-called decal process, in which a catalyst-containing layer is first applied to a carrier or decal film and is then transferred from the decal film to the membrane by pressure and sufficiently high temperature. S. H. Akella et al., Scientific Reports, Vol. 8, Article no. 12082, 2018, (DOI:10.1038/s41598-018-30215-0) examine the influence of various transfer films within the scope of the decal method on the properties of the membrane electrode assembly.

When a catalyst-coated membrane is operated for the first time, its full capacity is not usually available. This only develops over time. Often, activation procedures (called "break-in" or "conditioning") are employed for this purpose. However, these are time-consuming and require the use of resources.

US 2017/271693 A1 describes a method for activating fuel cells, wherein a cyclo-voltammetric pulse at high current intensity is repeatedly applied to the fuel cell.

U.S. Pat. No. 9,735,441 B2 describes a method for producing a catalyst-coated membrane, wherein a catalyst-containing ink is applied directly to the membrane and then a very thin catalyst layer is obtained on the membrane using a pressure and temperature treatment (345-10342 kPa; 130-146° C.).

With the PEM fuel cells, a distinction is made between low-temperature and high-temperature fuel cells. The NT PEM fuel cells usually contain a fluorinated polymer containing sulfonic acid groups as ionomer and can be operated at temperatures of up to approximately 80° C. Fluorinated ionomers containing sulfonic acid groups for PEM fuel cells are described, for example, by A. Kusoglu and A. Z. Weber in Chem. Rev., 2017, 117, p. 987-1104. HT fuel cells contain, for example, phosphoric acid as electrolyte and a basic polymer, such as a polyimide as matrix in order to bind the acid. HT-PEM fuel cells are operated, for example, at temperatures in the range of 130-220° C. The presence of the strong inorganic acid may result in a degradation of the catalyst material (e.g., the carrier material on which the precious metal is dispersed).

WO 2007/028626 A1 describes a method for conditioning a membrane electrode assembly, wherein the membrane contains an inorganic oxoacid of phosphorus and/or sulfur and a basic polymer (in particular a polybenzimidazole). After lamination of the polymer electrolyte matrix and the electrodes to give a membrane-electrode assembly, conditioning takes place in a temperature range of 60° C. to 300° C.

It is an object of the present invention to produce a catalyst-coated membrane for a fuel or electrolytic cell as efficiently as possible, wherein this membrane should exhibit high performance even in the initial operation so that a complex activation treatment can be dispensed with or at least reduced in its extent.

This object is achieved by a method for producing a membrane for a fuel or electrolytic cell, wherein
  (i) a liquid coating composition containing a supported precious metal-containing catalyst and an ionomer is applied to a polymer electrolyte membrane containing an ionomer so that a coated polymer electrolyte membrane with a catalyst-containing layer on its front and/or rear side is obtained, wherein the ionomer of the liquid coating composition and the ionomer of the polymer electrolyte membrane are each a copolymer which, as monomers, contain a fluoroethylene and a fluorovinyl ether containing a sulfonic acid group,
  (ii) the coated polymer electrolyte membrane is thermally treated by heating it to a temperature in the range of 178° C. to 250° C.

In the context of the present invention, a liquid catalyst-containing coating composition is applied directly to the polymer electrolyte membrane ("PEM"). A transfer step using a decal film at increased temperature and increased pressure is therefore not necessary. The membrane coated in the direct printing process can also have a lower electrical resistance, so that a higher efficiency can be realized. The ionomer is a fluorinated polymer containing sulfonic acid groups, as is usually used in low-temperature PEM fuel cells. Although the thermal treatment of the catalyst-coated membrane takes place at 178° C. to 250° C. and thus significantly above the usual operating temperature, it was surprisingly found in the present invention that with this thermal treatment a membrane is obtained which already has high efficiency during initial operation. Complex activation treatment in the fuel or electrolytic cell can thus be omitted or at least significantly reduced in its extent. Moreover, a membrane produced by the method according to the invention in a PEM fuel cell shows improved performance in the high-current range (mass transport range).

Copolymers, which as monomers contain a fluoroethylene and a fluorovinyl ether containing a sulfonic acid group and can function as ionomers in PEM fuel cells, are generally known to the person skilled in the art and can be produced by known methods or are commercially available. An overview of said ionomers can be found, for example, in the following publication: A. Kusoglu and A. Z. Weber in Chem. Rev., 2017, 117, p. 987-1104.

In the ionomer of the liquid coating composition and/or the ionomer of the polymer electrolyte membrane, the fluoroethylene is, for example, a tetrafluoroethylene, i.e. —$CF_2$—$CF_2$—.

For example, the fluorovinyl ether containing a sulfonic acid group may be perfluorinated in the ionomer of the liquid coating composition and/or the ionomer of the polymer electrolyte membrane.

In the ionomer of the liquid coating composition and/or the ionomer of the polymer electrolyte membrane, the fluorovinyl ether containing a sulfonic acid group has the following formula (I), for example:

$$-CF(OR)-CF_2- \quad (I)$$

wherein
R has the following formula (II):

$$-(CF_2-CF(CF_3)-O)_x-(CF_2)_y-SO_3H \quad (II)$$

where x=0-3 and y=1-5.

According to one exemplary embodiment, x=0-3 and y=2-5.

According to a further exemplary embodiment, x=0 or 1 and y=1-5.

For example, x=1 and y=2; or x=0 and y=2, 3 or 4.

In addition to the fluoroethylene and the fluorovinyl ether containing a sulfonic acid group, the copolymer may optionally contain at least one further monomer. Alternatively, however, it is also possible for the copolymer to contain no further monomer.

The ionomer of the liquid composition and the ionomer of the polymer electrolyte membrane may be identical. Alternatively, the two ionomers can differ in at least one of their properties, for example in their molecular weight. For example, the ionomer present in the polymer electrolyte membrane may have a higher average molecular weight than the ionomer present in the liquid coating composition. A further ionomer may optionally be present in the polymer electrolyte membrane. Alternatively, it may be preferred within the scope of the present invention that the PEM contains no further ionomer.

The PEM preferably contains no polymer containing a basic monomer (for example, a nitrogen-containing monomer, such as a nitrogen-containing heterocyclic monomer).

In a preferred embodiment, the polymer electrolyte membrane does not contain any inorganic oxoacid of phosphorus (such as phosphoric acid) and/or of sulfur (such as sulfuric acid).

In order to improve the mechanical strength and dimensional stability, the polymer electrolyte membrane may optionally also contain further components, such as a polytetrafluoroethylene in the form of a mesh.

Supported precious metal-containing catalysts for fuel or electrolysis cells are known to the person skilled in the art. The precious metal is preferably a platinum metal (Pt, Pd, Ir, Rh, Ru or Os). The precious metal may be present in elemental form or as an alloy. For example, a carbon material or an oxide (e.g. a transition metal oxide such as titanium dioxide) acts as the carrier material. A carbon material is preferred. An exemplary supported catalyst for a fuel or electrolytic cell is described in EP 2954951 A1.

The liquid coating composition is preferably an aqueous coating composition. In addition to water, the coating composition may also contain one or more organic solvents, for example a $C_{1-4}$ alcohol, such as methanol, ethanol, or n-propanol.

For example, the liquid coating composition contains the supported precious metal-containing catalyst in an amount of 5-20 wt %, the ionomer in an amount of 2-8 wt % and water in an amount of at least 60 wt %, as well as a $C_{1-4}$ alcohol (in particular methanol, ethanol or n-propanol or a mixture of at least two of these alcohols) in an amount of 10-20 wt %.

The liquid coating composition can be applied to the polymer electrolyte membrane by conventional methods known to the qualified person. For example, the liquid coating composition is applied through a nozzle (e.g., a slotted nozzle), a scraper, a roller, a rod (e.g., a Meyer rod), a spraying device, screen printing, offset printing, stencil printing, halftone printing, or a combination of at least two of these coating methods.

The liquid coating composition may, for example, be applied both to the front side and the back side of the polymer electrolyte membrane. This application can take place simultaneously or successively.

Alternatively, it is also possible within the scope of the present invention to apply the liquid coating composition as a first coating composition only on the front side of the polymer electrolyte membrane and to apply a second liquid coating composition on the opposite side, wherein the first coating composition and the second coating composition are different. The first coating composition and the second coating composition may be applied simultaneously or at different times. Like the first coating composition, the second coating composition may also contain a supported precious metal-containing catalyst and an ionomer. With regard to the preferred properties of these two components, reference can be made to the above explanations. For example, the two coating compositions differ in their content of supported precious metal-containing catalyst.

When the liquid coating composition is applied, the polymer electrolyte membrane has, for example, a temperature in the range of 20-120° C., more preferably 20-70° C.

After the application of the liquid coating composition and before the thermal treatment at 178° C.-250° C. in step (ii), the coated PEM may optionally still be subjected to a drying step. For drying, the temperature of the polymer electrolyte membrane is, for example, 20° C. to 120° C. The duration of drying is, for example, 1-10 minutes.

The layer containing the catalyst present on the coated polymer electrolyte membrane has, for example, a thickness in the range of 40-300 μm before drying. On the anodic side of the PEM, the thickness before drying is, for example, 40-100 μm, while the thickness on the cathodic side before drying is, for example, 200-300 μm. After drying, the catalyst-containing layer present on the coated polymer electrolyte membrane has, for example, a thickness in the range of 1-30 μm (on the anodic side of the PEM, for example, 1-10 μm and on the cathodic side, for example, 5-30 μm).

During drying, the coated polymer electrolyte membrane is preferably not exposed to any external pressure.

In step (ii) of the method according to the invention, the coated polymer electrolyte membrane is heated to a temperature in the range of 178° C. to 250° C.

As described in more detail below, the thermal treatment in step (ii) results in a membrane which
 already shows high performance in the cell during initial operation, as a result of which a complex activation treatment in the fuel or electrolysis cell can be omitted or at least significantly reduced in its extent, and
 shows significantly improved performance in the high-current region (mass transport region).

With regard to energy-efficient process control, it can be advantageous, for example, to carry out the thermal treatment at 178-210° C. However, the method according to the invention may also be carried out by heating the polymer electrolyte membrane for the thermal treatment to a temperature of 200-250° C. or 220-250° C. or 230-250° C.

The polymer electrolyte membrane heated to 178° C. to 250° C. is held in this temperature range, for example, for a period of 1 second to 5 minutes. During the thermal treatment in step (ii), the coated polymer electrolyte membrane is preferably not exposed to any external pressure.

Heating of the coated polymer electrolyte membrane to the required temperature can be effected by conventional devices generally known to the qualified person. For example, the thermal treatment takes place in a furnace and/or by a radiator (for example, an IR radiator).

The thermal treatment preferably takes place at 178-250° C. in a current-free and zero-potential manner, i.e., the coated polymer electrolyte membrane is not connected to a current or voltage source during the thermal treatment. The thermal treatment of the coated polymer electrolyte membrane preferably takes place outside a fuel or electrolytic cell.

The membrane produced with the method according to the invention can be used, for example, in a hydrogen or methanol fuel cell or a water electrolytic cell.

The present invention also relates to a method for producing a fuel or electrolytic cell, comprising:
producing the membrane according to the above-described method according to the invention,
installing the membrane in a fuel or electrolytic cell.

The invention is explained in more detail with reference to the following examples.

EXAMPLES

In all examples, a supported platinum catalyst (carbon as carrier material) was used.

Example 1

A polymer electrolyte membrane was used whose ionomer is a copolymer of tetrafluoroethylene and a vinyl ether containing a perfluorinated sulfonic acid group. The membrane is commercially available from Gore under the designation MX820.15.

An aqueous coating composition was prepared. This contained the supported platinum catalyst in an amount of 7.19 wt. % and an ionomer in an amount of 4.05 wt. %. The ionomer was a copolymer of tetrafluoroethylene and a vinyl ether containing a perfluorinated sulfonic acid group represented by the following formula:

—CF(OR)—CF$_2$— wherein
R has the formula:

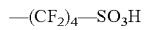
—(CF$_2$)$_4$—SO$_3$H

The aqueous coating composition was applied successively at 40° C. to the front and rear sides of the membrane by a slit scraper having a slit height of 175 μm, and then dried.

In this way, several coated membranes were produced. Each of these catalyst-coated membranes was then subjected to a thermal treatment, wherein the membranes were heated to different temperatures.
Membrane 1.1: Heated to 150° C.
Membrane 1.2: Heated to 160° C.
Membrane 1.3: Heated to 170° C.
Membrane 1.4: Heated to 180° C.
All membranes were heated in an oven for a period of 4 minutes.

Figure 3:
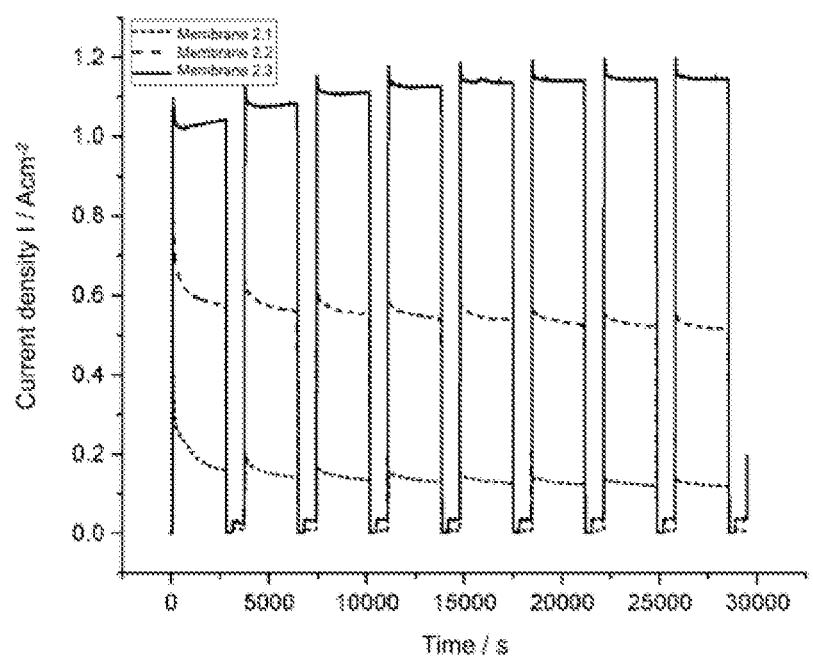

For each of these 4 membranes, the current density was then determined as a function of time in order to observe the "break-in" behavior. For this purpose, a respective commercially available gas diffusion layer (28BC by SGL Carbon) was applied on each side of the coated membrane and this arrangement was installed in a test cell with 20% compression. The test cell comprises heatable end plates as well as gold-coated current collectors and gas distribution plates made of graphite. After installation in a test plant (G40 by Greenlight Innovation), the following conditions were set: Cell temperature 60° C.; relative input humidity of the gases on the anode and cathode 100%; input pressure on the anode and cathode 150 kPa (abs.); gas flow at the anode 1394 standard cubic centimeters of hydrogen; gas flow at the cathode 3323 standard cubic centimeters of air. The break-in, as can be seen in FIGS. 1 and 3, consists of 8 identical voltage-guided load cycles with the following profile: 45 min at 0.6 V, 5 min at 0.95 V and 10 min at 0.85 V.

FIG. 1 shows the results of these measurements.

Thermal treatment at 180° C. leads to a significant increase in performance under moist operating conditions and to performance stabilization, which starts very early rather than after a plurality of cycles. A so-called "preconditioning" or "break-in" step for activating the membrane can therefore be omitted.

Figure 2:
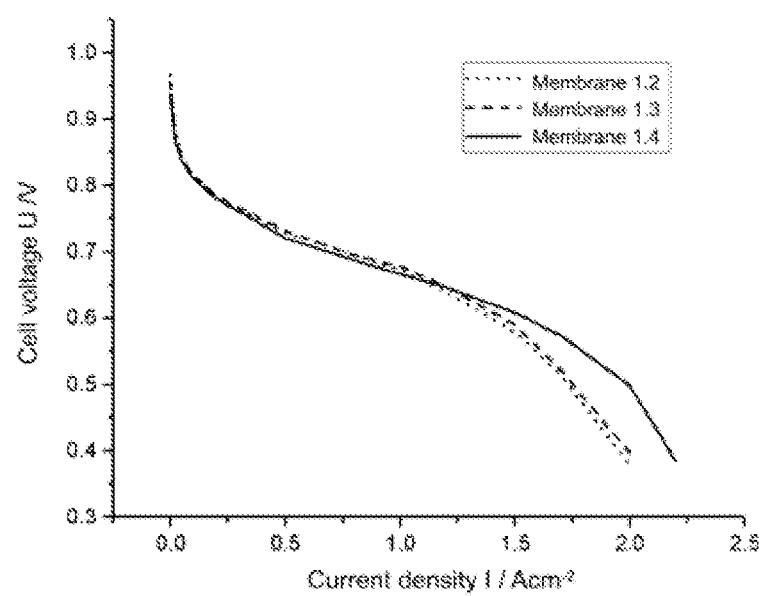

For each of the membranes 1.1 to 1.4, the polarization curve (cell voltage as a function of current density) under SAE conditions (cell temperature 80° C.; relative inlet humidity of the gases on anode and cathode 66%; inlet pressure on anode and cathode 170 kPa (abs.); gas flow at anode 1000 standard cubic centimeter of hydrogen; gas flow at cathode 5000 standard cubic centimeter of air) was also determined. The results are shown in FIG. 2. A significant increase in the high current range (>0.6 A/cm$^2$) is shown for the membrane that was heated to 180° C., compared to the membranes treated at a lower temperature.

Example 2

The polymer electrolyte membrane in Example 2 corresponded to the polymer electrolyte membrane used in Example 1.

An aqueous coating composition was prepared. This contained the supported platinum catalyst in an amount of 5 wt % and an ionomer in an amount of 2.24 wt %. The ionomer was a copolymer of tetrafluoroethylene and a vinyl ether containing a perfluorinated sulfonic acid group represented by the following formula:

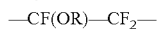
—CF(OR)—CF$_2$— wherein
R has the formula:

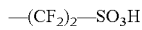
—(CF$_2$)$_2$—SO$_3$H

The aqueous coating composition was applied at 40° C. with a slit scraper having a slit height of 100 μm on the front and 300 μm on the rear side of the membrane, and then dried.

In this way, several coated membranes were produced. Each of these catalyst-coated membranes was then subjected to a thermal treatment, wherein the membranes were heated to different temperatures.
Membrane 2.1: Heated to 155° C.
Membrane 2.2: Heated to 175° C.
Membrane 2.3: Heated to 205° C.
All membranes were heated in an oven for a period of 4 minutes.

For each of these 4 membranes, the current density was subsequently determined as a function of time.

FIG. 3 shows the results of these measurements.

Thermal treatment at 205° C. leads to a significant increase in performance under moist operating conditions and to performance stabilization, which starts very early rather than after a plurality of cycles. A so-called "preconditioning" or "break-in" step for activating the membrane can therefore be omitted.

The invention claimed is:

1. A method for producing a membrane for a fuel or electrolytic cell, comprising:
    (i) applying a liquid coating composition containing a supported precious metal-containing catalyst and an ionomer both to a front side and a back side of a polymer electrolyte membrane containing an ionomer, or a first liquid coating composition containing a supported precious metal-containing catalyst and an ionomer is applied only on a front side of a polymer electrolyte membrane containing an ionomer, and a second liquid coating composition containing a supported precious metal-containing catalyst and an ionomer is applied on a back side of the polymer electrolyte membrane, wherein the first and second liquid coating compositions are different, so that a coated polymer electrolyte membrane with a catalyst-containing layer on its front and back side is obtained, wherein the ionomer of the liquid coating composition and the ionomer of the polymer electrolyte membrane are each a copolymer which, as monomers, contain a fluoroethylene and a fluorovinyl ether containing a sulfonic acid group, wherein the fluorovinyl ether containing a sulfonic acid group has the formula (I):

    —CF(OR)—CF$_2$—   (I)

wherein
    R has the following formula (II):

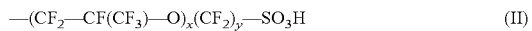
    —(CF$_2$—CF(CF$_3$)—O)$_x$(CF$_2$)$_y$—SO$_3$H   (II)

where x=0-3 and y=1-5, and (ii) thermally treating the coated polymer electrolyte membrane by heating it to a temperature in a range of 178° C. to 250° C. without exposure to external pressure.

2. The method according to claim 1, wherein the fluoroethylene is a tetrafluoroethylene.

3. The method according to claim 1, wherein the polymer electrolyte membrane does not contain any additional ionomer; or the polymer electrolyte membrane does not contain any inorganic oxoacid of the phosphorus or sulfur.

4. The method according to claim 1, wherein no polymer containing a basic monomer is present in the polymer electrolyte membrane.

5. The method according to claim 1, wherein the precious metal is a platinum metal and the supported catalyst contains, as carrier material, a carbon material or an oxide.

6. The method according to claim 1, wherein the liquid coating composition is an aqueous coating composition.

7. The method according to claim 6, wherein the aqueous coating composition contains the supported precious metal-containing catalyst in an amount of 5-20 wt %, the ionomer in an amount of 2-8 wt % and water in an amount of at least 60 wt %, and a C$_{1-4}$ alcohol in an amount of 10-20 wt %.

8. The method according to claim 1, wherein the liquid coating composition is applied to the polymer electrolyte membrane with a nozzle, scraper, roller, rod, spraying device, screen printing, offset printing, stencil printing, or halftone printing, or a combination of at least two of these coating methods.

9. The method according to claim 1, wherein the coated polymer electrolyte membrane is subjected to a drying step prior to the thermal treatment in step (ii).

10. The method according to claim 1, wherein the coated polymer electrolyte membrane heated to 178° C. to 250° C. in step (ii) is maintained in this temperature range for a period of from 1 second to 5 minutes.

11. The method according to claim 1, wherein the fuel cell is a hydrogen fuel cell or a methanol fuel cell; or wherein the electrolytic cell is a water electrolytic cell.

* * * * *